(12) United States Patent
Strandborg et al.

(10) Patent No.: US 12,511,768 B2
(45) Date of Patent: Dec. 30, 2025

(54) METHOD AND APPARATUS FOR DEPTH IMAGE ENHANCEMENT

(71) Applicant: Varjo Technologies Oy, Helsinki (FI)

(72) Inventors: Mikko Strandborg, Hangonkylä (FI); Mikko Ollila, Tampere (FI)

(73) Assignee: Varjo Technologies Oy, Helsinki (FI)

(*) Notice: Subject to any disclaimer, the term of this patent is extended or adjusted under 35 U.S.C. 154(b) by 90 days.

(21) Appl. No.: 18/518,576

(22) Filed: Nov. 23, 2023

(65) Prior Publication Data

US 2025/0173884 A1 May 29, 2025

(51) Int. Cl.
| | |
|---|---|
| *G06T 7/593* | (2017.01) |
| *G01S 17/86* | (2020.01) |
| *G06T 5/50* | (2006.01) |
| *G06T 7/521* | (2017.01) |
| *G06T 7/73* | (2017.01) |
| *H04N 23/45* | (2023.01) |
| *H04N 25/704* | (2023.01) |

(52) U.S. Cl.
CPC .......... *G06T 7/593* (2017.01); *G01S 17/86* (2020.01); *G06T 5/50* (2013.01); *G06T 7/521* (2017.01); *G06T 7/73* (2017.01); *H04N 23/45* (2023.01); *H04N 25/704* (2023.01); *G06T 2207/10012* (2013.01); *G06T 2207/10024* (2013.01); *G06T 2207/10028* (2013.01); *G06T 2207/20021* (2013.01); *G06T 2207/20212* (2013.01)

(58) Field of Classification Search
CPC .......... G06T 7/593; G06T 5/50; G06T 7/521; G06T 7/73; G06T 2207/10012; G06T 2207/10024; G06T 2207/10028; G06T 2207/20021; G06T 2207/20212; G01S 17/86; H04N 23/45; H04N 25/704
USPC ............................................. 348/48; 382/154
See application file for complete search history.

(56) References Cited

U.S. PATENT DOCUMENTS

| | | | | |
|---|---|---|---|---|
| 10,070,042 | B2* | 9/2018 | Nikkanen | H04N 17/002 |
| 11,405,535 | B2* | 8/2022 | Galor Gluskin | H04N 23/55 |
| 11,729,504 | B2* | 8/2023 | Mishra | H04N 23/665 |
| | | | | 348/207.99 |
| 11,985,421 | B2* | 5/2024 | Stepanova | H04N 23/617 |
| 12,019,796 | B2* | 6/2024 | Zhang | G06F 3/011 |
| 12,112,457 | B2* | 10/2024 | Ollila | G06T 5/73 |
| 12,254,644 | B2* | 3/2025 | Attar | G06T 5/20 |
| 2017/0272642 | A1* | 9/2017 | Zhang | H04N 25/702 |
| 2023/0245267 | A1* | 8/2023 | Jung | H04N 23/67 |
| | | | | 382/100 |
| 2024/0144717 | A1* | 5/2024 | Feng | H04N 23/12 |

(Continued)

*Primary Examiner* — Christopher S Kelley
*Assistant Examiner* — Asmamaw G Tarko
(74) *Attorney, Agent, or Firm* — Ziegler IP Law Group, LLC.

(57) ABSTRACT

A method for depth image enhancement implemented in at least one apparatus includes reading and processing Phase Detection Autofocus (PDAF) pixels of a region-of-interest (ROI) area of a gaze region in an image obtained from a color camera sensor; utilizing one or more depth camera sensors to provide one or more depth maps of the ROI area of the gaze region; and combining the processed PDAF pixels of the ROI area of the gaze region and the one or more depth maps of the ROI area of the gaze region to obtain an updated ROI area with complementary depth information of the ROI area of the gaze region.

15 Claims, 3 Drawing Sheets

(56) References Cited

U.S. PATENT DOCUMENTS

2024/0334050 A1* 10/2024 Stepanova .............. G06T 7/246
2025/0104379 A1*  3/2025 Liu ........................ H04N 23/88

* cited by examiner

METHOD AND APPARATUS FOR DEPTH IMAGE ENHANCEMENT

TECHNICAL FIELD

The present disclosure relates to a method for depth image enhancement. Moreover, the present disclosure relates to an apparatus for depth image enhancement.

BACKGROUND

Conventional depth cameras, such as Time-of-Flight (ToF) and Light Detection and Ranging (LIDAR) depth cameras, have been commonly employed to capture depth information in Extended Reality (XR) headsets. However, these depth cameras exhibit inherent limitations in terms of resolution when compared to a color camera having high-resolution. The low resolution of these depth cameras leads to poor quality images, especially in the vicinity of depth discontinuities, which correspond to object edges and silhouettes. Therefore, the inability to accurately capture depth information in aforementioned regions poses a challenge in creating an immersive XR experience and accurately tracking objects in a three-dimensional (3D) space. In the XR headsets, the depth cameras are typically positioned at different physical locations from the color cameras, creating a misalignment issue. To address the misalignment issue, a reprojection process is often employed to align the depth map with the viewpoint of each color camera. The reprojection process may fail due to disocclusion, further hindering the accurate registration of depth information with the corresponding color imagery. Each depth camera has its own typical limitations, such as each of the ToF and LiDAR camera leads to erroneous depth measurements when dealing with reflective or absorbing surfaces.

Currently, certain attempts have been made to enhance the depth sensing in XR headsets, such as by use of Phase Detection Autofocus (PDAF) pixels in the context of XR headsets. The PDAF pixels are used for autofocus in mobile phone cameras, measuring the optical distance to a given object. However, the PDAF pixels are not typically used as the depth cameras for XR headsets due to following reasons. The PDAF pixels are not well suited for capturing depth information on flat surfaces with minimal high-frequency variation. Although the PDAF pixels can provide absolute distance information, however they lack the ability to precisely compute the exact distance to an object. This limitation restricts the accuracy of the PDAF pixels in applications where precise depth measurements are required. Thus, there exists a technical problem of how to capture more reliable depth information in the immersive XR environment.

Therefore, in light of the foregoing discussion, there exists a need to overcome the aforementioned drawbacks associated with the conventional ways of capturing the depth information using typical depth cameras in the XR headsets.

SUMMARY

The aim of the present disclosure is to provide a method and an apparatus for depth image enhancement in an immersive XR environment. The aim of the present disclosure is achieved by a method and an apparatus for depth image enhancement that provides more reliable three-dimensional (3D) information on a gaze region without affecting frame rate of depth cameras and color cameras as defined in the appended independent claims to which reference is made to. Advantageous features are set out in the appended dependent claims.

Embodiments of the present disclosure substantially eliminate or at least partially address the aforementioned problems in the prior art, and enable obtaining complementary information of a region-of-interest (ROI) area of a gaze region of an image by combining processed PDAF pixels and one or more depth maps of the ROI area of the gaze region of the image.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
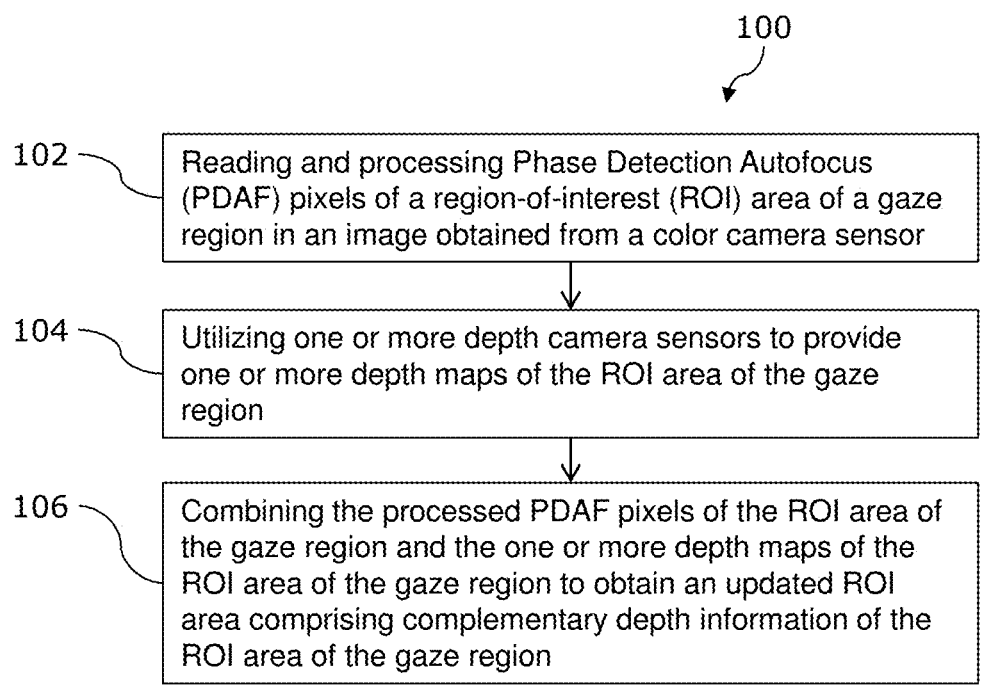
FIG. 1 is a flowchart of a method for depth image enhancement, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a method for depth image enhancement implemented in at least one apparatus, the method comprising:
  reading and processing Phase Detection Autofocus (PDAF) pixels of a region-of-interest (ROI) area of a gaze region in an image obtained from a color camera sensor;
  utilizing one or more depth camera sensors to provide one or more depth maps of the ROI area of the gaze region; and
  combining the processed PDAF pixels of the ROI area of the gaze region and the one or more depth maps of the ROI area of the gaze region to obtain an updated ROI area comprising complementary depth information of the ROI area of the gaze region.

In a second aspect, the present disclosure provides an apparatus for depth image enhancement, the apparatus comprising:
  a color camera sensor;
  one or more depth camera sensors; and a processor configured to:
  read and process Phase Detection Autofocus (PDAF) pixels of a region-of-interest (ROI) area of a gaze region in an image obtained from the color camera sensor;
  process one or more depth maps of the ROI area of the gaze region obtained from the one or more depth camera sensors; and
  combine the processed PDAF pixels of the ROI area of the gaze region and the one or more depth maps of the ROI area of the gaze region to obtain an updated ROI area comprising complementary depth information of the ROI area of the gaze region.

The present disclosure provides the aforementioned method and the aforementioned apparatus for depth image enhancement which includes enhancement of the depth information and autofocus of the ROI area of the gaze region in the image. The aforementioned method and the aforementioned apparatus provide more reliable 3D information of the ROI area of the gaze region without affecting frame rate of the one or more depth camera sensors and the color camera sensor. The frame rate is not affected because reading and processing of the PDAF pixels of the ROI area of the gaze region and embedding the processed PDAF pixels with the one or more depth maps of the ROI area of the gaze region does not limit the bandwidth of a mobile industry processor interface (MiPi) output. Moreover, the typical limitations of the color camera sensor (e.g., a PDAF camera sensor) and the one or more depth camera sensors (e.g., a ToF camera, a LIDAR camera, etc.) are mostly non-overlapping therefore, they complement each other. For example, the PDAF camera sensor does not work well on flat surfaces, but the ToF camera provides reliable data on such surfaces. Conversely, the PDAF camera sensor has high resolution (equal to that of the color camera sensor) and is capable of distinguishing silhouettes or depth discontinuities. Since, the PDAF pixels are built into the color camera sensor itself, the resulting depth data (i.e., the one or more depth maps) is not required to be reprojected on the color camera sensor and therefore, eliminates the misalignment issue and provides improved quality images. Additionally, the color camera sensor (i.e., the PDAF camera sensor) and the one or more depth camera sensors are physically at different locations, therefore, triangulation can be used to weed out errors and to perform denoising if any noise is present in the output. Although the denoising automatically occurs when the processed PDAF pixels are combined with the one or more depth maps of the ROI area of the gaze region. Moreover, the PDAF camera sensor can be foveated means the PDAF camera sensor can selectively focus on specific areas in a similar way to a variable size and shape target (VST) crop/bin setup that is currently in use. The PDAF camera sensor can be foveated-at-will represents a flexible and adjustable nature of the PDAF camera sensor towards foveation capability.

Throughout the present disclosure, the term "depth image enhancement" refers to a process or a technique that improves the quality and visual representation of depth information within an image. The depth information refers to the spatial distance of objects in a scene, providing a sense of three-dimensionality, which is applicable in object recognition, three-dimensional (3D) reconstruction, augmented reality (AR), virtual reality (VR), extended reality (XR), and the like.

Throughout the present disclosure, the term "apparatus" refers to a specialized equipment that is configured for depth image enhancement in an extended-reality (XR) environment. It will be appreciated that the term "apparatus" encompasses a head-mounted display (HMD) device and, optionally, a computing device communicably coupled to the HMD device. The term "head-mounted display" device refers to specialized equipment that is configured to present the XR environment to a user when said HMD device, in operation, is worn by said user on his/her head. The HMD device is implemented, for example, as an XR headset, a pair of XR glasses, and the like, which is operable to display a visual scene of the XR environment to the user. The term "extended-reality" encompasses virtual reality (VR), augmented reality (AR), mixed reality (MR), and the like.

In operation, the method comprises reading and processing Phase Detection Autofocus (PDAF) pixels of a region-of-interest (ROI) area of a gaze region in an image obtained from a color camera sensor. In an implementation, the color camera sensor is configured to capture the image from a real-world environment. Throughout the present disclosure, the term "color camera sensor" refers to an image sensor that captures visual information and converts the visual information into an electrical signal. The term "image sensor" refers to a device which detects light from the real-world environment at its photo-sensitive surface, when said light is incident thereupon. The image sensor comprises a plurality of photo-sensitive elements, which collectively form the photo-sensitive surface of the image sensor. Upon such detection of the light from the real-world environment, the plurality of photo-sensitive elements captures a plurality of image signals. The plurality of image signals are electrical signals pertaining to a real-world scene of the real-world environment. The plurality of image signals is processed (by an image signal processor or the processor of the apparatus) to generate a digital image. A given photo-sensitive element is known as a picture element, or a pixel. It will be appreciated that the plurality of photo-sensitive elements could be arranged in a required manner (for example, a rectangular two-dimensional (2D) grid, a polygonal arrangement, a circular arrangement, an elliptical arrangement, a freeform arrangement, and the like) to form the photo-sensitive surface of the image sensor. Examples of the color camera sensor include, but are not limited to, a video-see-through (VST) color camera sensor, a charge-coupled device (CCD) image sensor, a complementary metal-oxide-semiconductor (CMOS) image sensor, and the like.

Optionally, the color camera sensor is one of a: dual pixel PDAF camera or all pixel PDAF camera. In an implementation, the color camera sensor is used as the dual pixel PDAF camera. In the dual pixel PDAF camera, each pixel is split into two light-sensitive photodiodes, each with their own micro-lens, or on-chip lens (OCL). In the dual pixel PDAF camera, approximately (e.g., 100%) all the pixels on the color camera sensor are used for both autofocus and imaging. In contrast to the dual pixel PDAF camera, a conventional PDAF sensor where less than 5% of PDAF pixels are used for autofocus and imaging and therefore, inefficient to provide reliable information. The use of the dual pixel PDAF camera leads to an improvement in the focusing performance of the color camera sensor in terms of speed and reliability. In another implementation, the color camera sensor is used as the all pixel PDAF camera. The all pixel PDAF camera may also be referred to as a quad pixel PDAF camera (e.g., a 2×2 OCL camera). In the quad pixel PDAF camera, each pixel is split into four light-sensitive photodiodes therefore, the quad pixel PDAF camera is able to analyze in left/right directions as well as in top/bottom directions. The quad pixel PDAF camera is more reliable and accurate than the dual pixel PDAF camera.

The image obtained from the color camera sensor comprises the gaze region which includes the ROI area from which the PDAF pixels are read and processed. In an implementation, the ROI area may be a portion of the gaze region where a user is looking or directing his gaze. The ROI area can be static or dynamic based on an application but typically, the ROI area is pre-determined. The Gaze region is inherently dynamic and changes over time as the user's attention shifts.

Throughout the present disclosure, the term "gaze region" refers to a part of an image or a scene that attracts a person's attention at a specific moment in time. The analysis of the gaze region is used to understand where individuals focus their attention when viewing an image, video or scene. The analysis of the gaze region provides insights into visual perception, user behavior, and cognitive processes.

Throughout the present disclosure, the term "region-of-interest (ROI) area" refers to a specific area or a portion of an image that is selected for a detailed examination or analysis. The ROI area can vary in shape and size and can be manually or automatically defined. The ROI area can be chosen based on an analyst's interest in particular features, objects or details within the image.

Throughout the present disclosure, the term "phase detection autofocus (PDAF)" refers to an autofocus technology used in camera sensors to accurately focus on a subject. Unlike to contrast-detection autofocus technology, which analyses image contrast to determine focus, the PDAF technology mimics the way the human eye focuses by comparing phases of light. The PDAF pixels can be partially embedded into a typical color camera sensor. Alternatively, the entire color camera sensor can be made out of PDAF pixels. The PDAF operates by splitting an incoming light into two or more separate beams. This can be achieved by using a partially reflective surface, a micro-lens array, or other techniques. The split beams of light are directed to two separate photo sites or pixels on the camera sensor. The pixels are then used to compare the phase difference between the two beams. Thereafter, the camera's autofocus system uses the information about the phase difference to determine whether an image is in focus or not. If the phase difference indicates that the image is out of focus, the camera adjusts the lens elements to bring the phases into alignment, thereby achieving focus.

In an implementation, the PDAF pixels can be used (somewhat indirectly) to measure the optical distance to a given object. If the image is in focus, the object is at the current focal distance of the lens system. If the image is defocused, the amount of defocus can be used to calculate how far off from the focal length the object resides, however, the direction of error can't be measured (i.e., whether the object is too far or too close), just the absolute distance.

Optionally, the ROI area is equivalent to an entire region of the image. In an implementation, the ROI area is equivalent to the entire region of the image instead of the portion of the image. That means the entire region of the image is used for a detailed analysis.

The method further comprises utilizing one or more depth camera sensors to provide one or more depth maps of the ROI area of the gaze region. Throughout the present disclosure, the term "one or more depth camera sensors" refers to one or more depth sensing cameras or 3D cameras which is configured to capture not only the color of objects but also the distance or depth of objects from the camera. The depth information is valuable for applications requiring three-dimensional understanding of a scene from the real-world environment. The "one or more depth camera sensors" could be arranged on the apparatus worn by the user on his/her head or could be arranged anywhere in the real-world environment where the user is present or could be arranged on a remote device present in the real-world environment. Examples of the "one or more depth camera sensors" include, but are not limited to, a Red-Green-Blue-Depth (RGB-D) camera, a stereo camera, a ranging camera, a Light Detection and Ranging (LIDAR) camera, a flash LiDAR camera, a Time-of-Flight (ToF) camera, a Sound Navigation and Ranging (SONAR) camera, a laser rangefinder, a plenoptic camera, an infrared camera. Optionally, the one or more depth camera sensors is one of a: Time-of-Flight (ToF) camera or a Light Detection and Ranging (LiDAR) camera.

Throughout the present disclosure, the term "one or more depth maps" refers to one or more data structures that include information about the distances between the surfaces of objects or specific parts of objects in a scene and a reference point. Typically, the camera is considered as the reference point. The "one or more depth maps" may also be referred to as one or more depth images. Each pixel in a depth map has a value that represents the distance from the camera to the corresponding point in the scene. This distance information is often expressed in units, such as meters or millimeters (mm). The "one or more depth maps" can be visualized using grayscale intensity, where darker shades correspond to objects closer to the camera, and lighter shades represent objects farther away. In some cases, color may be used to convey depth information, with a color gradient indicating varying distances. In an implementation, the one or more depth maps may be generated by use of the one or more depth camera sensors, such as time-of-flight (ToF) cameras, light detection and ranging (LIDAR) sensors, and the like, arranged on the apparatus.

The one or more depth maps of the ROI area of the gaze region include the information about the optical distances between various objects or specific parts of objects present in the ROI area from a reference point. In an implementation, the physical location of the one or more depth camera sensors can be considered as the reference point. In another implementation, where the ROI area is equivalent to the entire region of the image, the one or more depth maps include the information about the optical distances between various objects or specific parts of objects present in the entire image from the reference point.

Optionally, the color camera sensor and the one or more depth camera sensors are at different physical locations in the at least one apparatus. In the at least one apparatus, the color camera sensor (e.g., the PDAF camera) and the one or more depth camera sensors (e.g., the ToF or LIDAR camera) are physically at different locations. Therefore, triangulation can be used to weed out errors and to perform denoising in case any noise is present in the image.

The method further comprises combining the processed PDAF pixels of the ROI area of the gaze region and the one or more depth maps of the ROI area of the gaze region to obtain an updated ROI area comprising complementary depth information of the ROI area of the gaze region. The processed PDAF pixels of the ROI area of the gaze region and the one or more depth maps of the ROI area of the gaze region are combined to obtain more reliable and accurate depth maps which are aligned with the image captured by the color camera sensor. The combination (or fusion) of the processed PDAF pixels and the one or more depth maps eliminates the reprojection of the one or more depth maps on the color camera sensor. The reason being the PDAF pixels are built into the color camera sensor itself therefore, the one or more depth maps is not required to be reprojected on the color camera sensor and therefore, eliminates the misalignment issue and provides an enhanced depth information. Consequently, the enhanced depth information is utilized in enhancing the autofocus. Therefore, the combination (or fusion) of the processed PDAF pixels and the one or more depth maps leads to the enhancement of the depth information as well as the autofocus of the image. After combination of the processed PDAF pixels and the one or more depth maps of the ROI area, the updated ROI area is obtained that manifests enhanced depth information and autofocus.

Optionally, the reading and processing PDAF pixels comprises reading PDAF pixels of a plurality of ROI areas of a gaze region of a scene captured by using two color camera sensors in a stereo configuration. In the stereo configuration, two color camera sensors (e.g., a left VST color camera and a right VST color camera) are used to capture the scene from the real-world environment having different view-points. The captured scene comprises the gaze region which comprises the plurality of ROI areas and the PDAF pixels of the plurality of ROI areas are read and processed.

Optionally, the reading and processing of the PDAF pixels further comprises dividing the plurality of ROI areas of the gaze region in such a way that the divided plurality of ROI areas are complementary to each other and partially overlapping with each other. The read and processed PDAF pixels (or PDAF data) of the plurality of ROI areas are divided in the way that the divided plurality of ROI areas is complementary to each other and partially overlapping with each other. This means that the plurality of ROI areas covers different parts of the scene or subject being captured. Moreover, the plurality of ROI areas partially overlaps with each other which means that each camera (i.e., the left VST color camera and the right VST color camera) focuses on a slightly different area or aspect of the scene. Additionally, each of the two color camera sensors may have slightly different viewing perspective.

Optionally, the reading and processing of the PDAF pixels further comprises excluding reading of depth camera pixels for one or more areas visible to the one or more depth cameras but occluded to the two color camera sensors. For example, in an implementation scenario, a depth map is created that corresponds to a color image captured from a color camera sensor then, in such case, there is no use of depth camera pixels that do not correspond to any pixel in the color image. In another implementation scenario, a depth camera captures a depth image from a slightly different viewpoint and, there are situations where the depth camera can see some areas that are occluded to the color camera sensor. In such implementation scenarios, the depth image is typically required to be reprojected to the color imagery to obtain the more depth information. However, in the present disclosure, it is advantageous to exclude reading of the depth camera pixels in the areas that are visible to the one or more depth camera sensors but occluded to the color camera sensor.

Optionally, the combining of the processed PDAF pixels comprises combining PDAF pixels of the divided plurality of ROI areas to obtain complementary depth information of the plurality of ROI areas of the gaze region. The divided PDAF pixels of the plurality of ROI areas are combined to obtain the complementary depth information of the plurality of ROI areas of the gaze region.

The present disclosure also relates to the apparatus as described above. Various embodiments and variants disclosed above, with respect to the aforementioned method, apply mutatis mutandis to the apparatus.

Optionally, the color camera sensor and the one or more depth camera sensors are at different physical locations in the apparatus.

Optionally, the apparatus further comprises two color camera sensors in a stereo configuration, wherein the reading and processing of the PDAF pixels comprises reading PDAF pixels of a plurality of ROI areas of a gaze region of a scene captured by the two color camera sensors in the stereo configuration.

Optionally, the reading and processing of the PDAF pixels further comprises dividing the plurality of ROI areas of the gaze region in such a way that the divided plurality of ROI areas are complementary to each other and partially overlapping with each other.

Optionally, the reading and processing of the PDAF pixels further comprises excluding reading of depth camera pixels for one or more areas visible to the one or more depth cameras but occluded to the two color camera sensors.

Optionally, the combining of the processed PDAF pixels comprises combining PDAF pixels of the divided plurality of ROI areas to obtain complementary depth information of the plurality of ROI areas of the gaze region.

DETAILED DESCRIPTION OF THE DRAWINGS

Referring to FIG. 1, illustrates steps of a method 100 for depth image enhancement implemented in at least one apparatus, in accordance with an embodiment of the present disclosure. At step 102, the method 100 includes reading and processing Phase Detection Autofocus (PDAF) pixels of a region-of-interest (ROI) area of a gaze region in an image obtained from a color camera sensor. At step 104, the method 100 includes utilizing one or more depth camera sensors to provide one or more depth maps of the ROI area of the gaze region. At step 106, the method 100 includes combining the processed PDAF pixels of the ROI area of the gaze region and the one or more depth maps of the ROI area of the gaze region to obtain an updated ROI area comprising complementary depth information of the ROI area of the gaze region.

The aforementioned steps are only illustrative and other alternatives can also be provided where one or more steps are added, one or more steps are removed, or one or more steps are provided in a different sequence without departing from the scope of the claims herein.

Figure 2A:
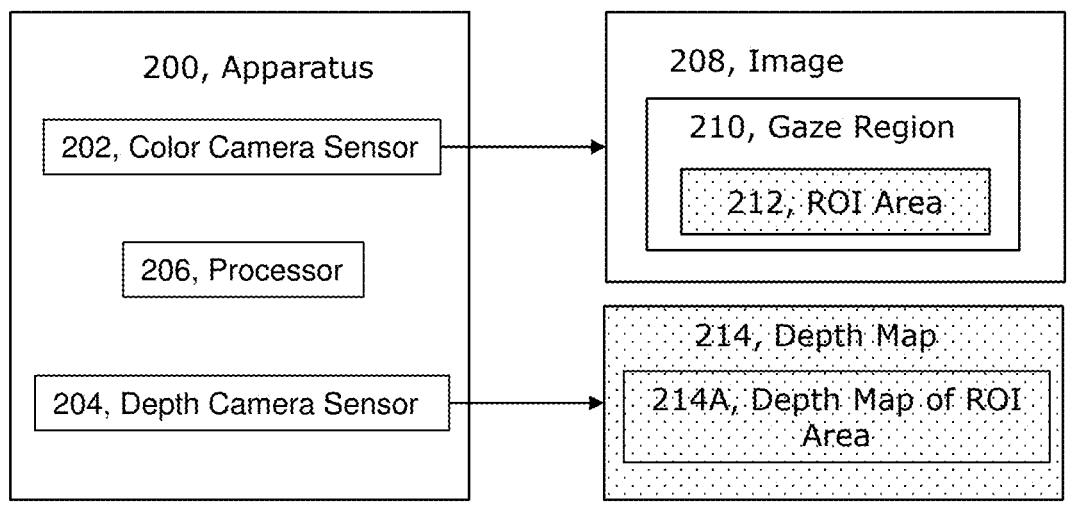
FIG. 2A is a block diagram that illustrates various exemplary components of an apparatus for depth image enhancement, in accordance with an embodiment of the present disclosure.

Referring to FIG. 2A, illustrates a block diagram of an apparatus 200 for depth image enhancement, in accordance with an embodiment of the present disclosure. The apparatus 200 includes a color camera sensor 202, one or more depth camera sensors 204 and a processor 206. The color camera sensor 202 is configured to capture an image 208 that includes a gaze region 210 which comprises a ROI area 212. The one or more depth camera sensors 204 is configured to provide one or more depth maps 214 of the image 208. The one or more depth maps 214 of the image 208 includes one or more depth maps 214A of the ROI area 212. The processor 206 is configured to read and process PDAF pixels of the ROI area 212 of the gaze region 210 in the image 208 obtained from the color camera sensor 202. The processor 206 is configured to process the one or more depth maps 214A of the ROI area 212 of the gaze region 210 obtained from the one or more depth camera sensors 204. The processor 206 is configured to combine the processed PDAF pixels of the ROI area 212 of the gaze region 210 and the one or more depth maps 214A of the ROI area 212 of the gaze region 210 to obtain an updated ROI area comprising complementary depth information of the ROI area 212 of the gaze region 210. Moreover, the color information available for areas outside the gaze region are read back either subsampled or binned, the apparatus 200 makes it possible to use the unused pixels for depth measurements.

Figure 2B:
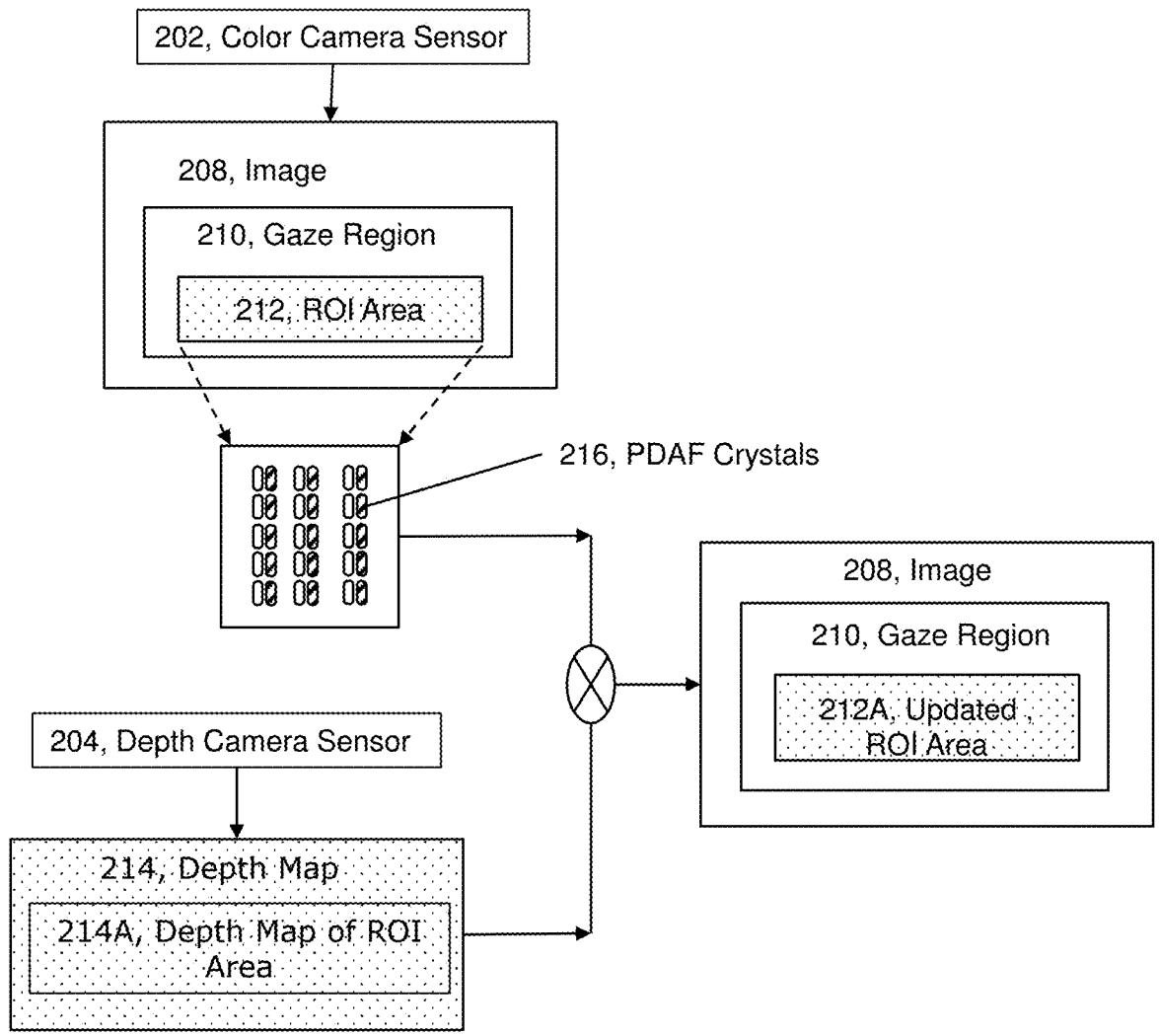
FIG. 2B is an operational diagram that illustrates various operations involved in depth image enhancement, in accordance with an embodiment of the present disclosure.

Referring to FIG. 2B, is an operational diagram for depth image enhancement, in accordance with an embodiment of the present disclosure. The color camera sensor 202 of the apparatus 200 is configured to capture the image 208 that includes the gaze region 210 which comprises the ROI area 212. The processor 206 of the apparatus 200 is configured to read and process PDAF pixels of the ROI area 212 of the gaze region 210 in the image 208 obtained from the color camera sensor 202. The processed PDAF pixels of the ROI area 212 of the gaze region 210 are represented as processed PDAF pixels 216. The one or more depth camera sensors 204 comprised by the apparatus 200 is configured to provide one or more depth maps 214 of the image 208. The one or more depth maps 214 of the image 208 includes one or more depth maps 214A of the ROI area 212. The processor 206 is configured to combine the processed PDAF pixels 216 of the ROI area 212 of the gaze region 210 and the one or more depth maps 214A of the ROI area 212 to obtain an updated ROI area 212A. The updated ROI area 212A comprises complementary depth information of the ROI area 212 of the gaze region 210. The complementary depth information may be utilized to enhance autofocus capability of the apparatus 200.

Figure 3:
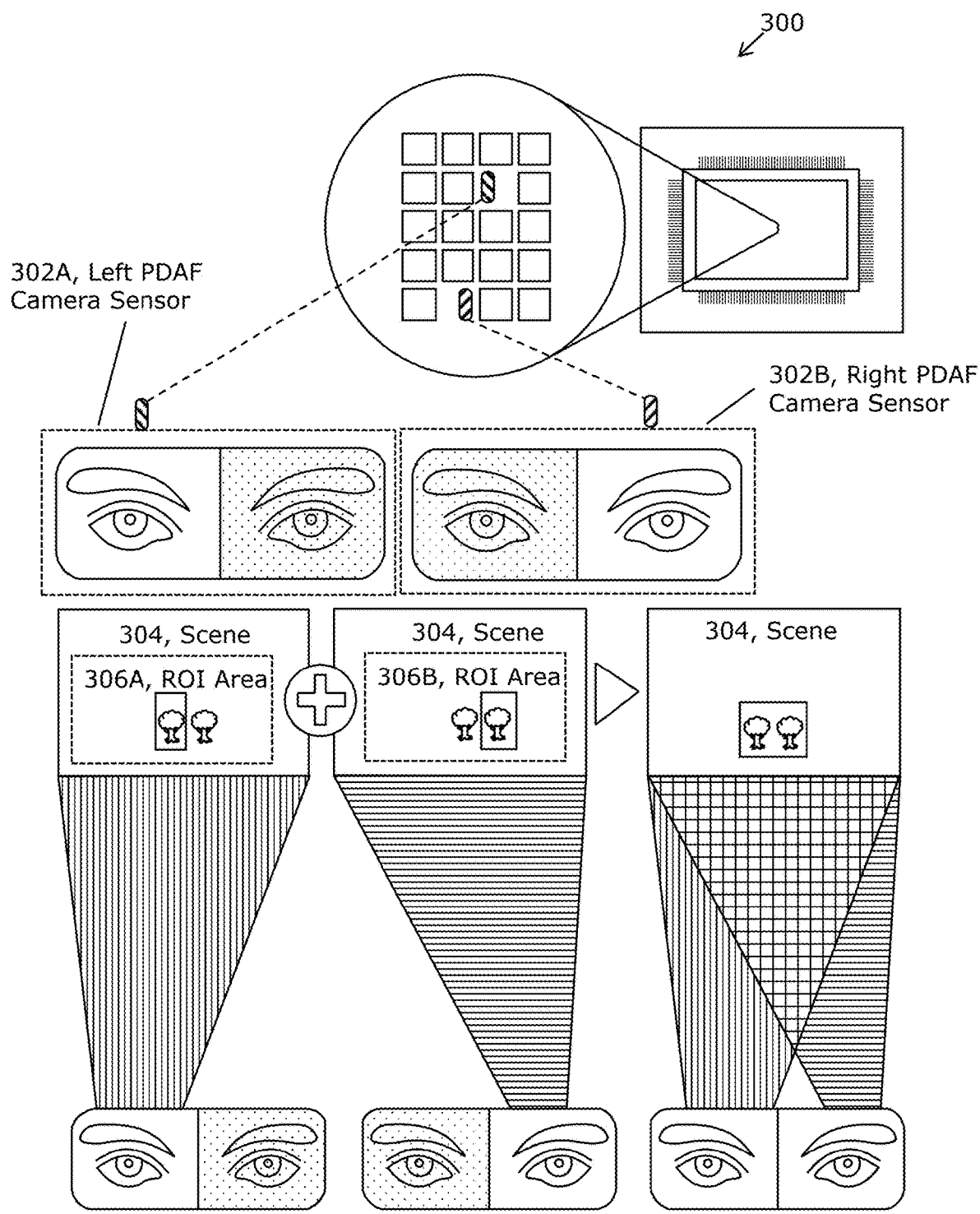
FIG. 3 illustrates reading and processing phase detection autofocus (PDAF) pixels in a stereo configuration, in accordance with an embodiment of the present disclosure.

Referring to FIG. 3, illustrates reading and processing phase detection autofocus (PDAF) pixels in a stereo configuration 300, in accordance with an embodiment of the present disclosure. In the stereo configuration 300, two color camera sensors (e.g., a left PDAF camera sensor 302A and a right PDAF camera sensor 302B) are used to capture a scene 304. Thereafter, PDAF pixels of a plurality of ROI areas of a gaze region of the scene 304 are read and processed. The read and processed PDAF pixels of the plurality of ROI areas of the gaze region of the scene 304 are divided in such a way that the divided plurality of ROI areas is complementary to each other and partially overlapping with each other. For example, a plurality of ROI area 306A captured by the left PDAF camera sensor 302A and a plurality of ROI area 306B captured by the right PDAF camera sensor 302B are complementary to each other and partially overlapping with each other. The plurality of ROI areas 306A and 306B covers different parts of the scene 304. Moreover, the plurality of ROI areas 306A and 306B partially overlaps with each other which means that each camera (i.e., the left PDAF camera sensor and the right PDAF camera sensor) focuses on a slightly different area or aspect of the scene 304. The divided PDAF pixels of the plurality of ROI areas 306A and 306B are combined to obtain the complementary depth information of the plurality of ROI areas of the gaze region of the scene 304.

The invention claimed is:

1. A method for depth image enhancement implemented in at least one apparatus, the method comprising:
reading and processing Phase Detection Autofocus (PDAF) pixels of a region-of-interest (ROI) area of a gaze region in an image obtained from a color camera sensor;
utilizing one or more depth camera sensors to provide one or more depth maps of the ROI area of the gaze region; and
combining the processed PDAF pixels of the ROI area of the gaze region and the one or more depth maps of the ROI area of the gaze region to obtain an updated ROI area comprising complementary depth information of the ROI area of the gaze region,
wherein the PDAF pixels and the one or more depth maps are processed and combined without reprojecting the depth data onto the image captured by the color camera sensor, and
wherein the processing and combination preserve the frame rate and output bandwidth of the apparatus.

2. The method of claim 1, wherein the color camera sensor and the one or more depth camera sensors are at different physical locations in the at least one apparatus.

3. The method of claim 1, wherein the ROI area is equivalent to an entire region of the image.

4. The method of claim 1, wherein the reading and processing PDAF pixels comprises reading PDAF pixels of a plurality of ROI areas of a gaze region of a scene captured by using two color camera sensors in a stereo configuration.

5. The method of claim 4, wherein the reading and processing of the PDAF pixels further comprises dividing the plurality of ROI areas of the gaze region in such a way that the divided plurality of ROI areas are complementary to each other and partially overlapping with each other.

6. The method of claim 5, wherein the combining of the processed PDAF pixels comprises combining PDAF pixels of the divided plurality of ROI areas to obtain complementary depth information of the plurality of ROI areas of the gaze region.

7. The method of claim 4, wherein the reading and processing of the PDAF pixels further comprises excluding reading of depth camera pixels for one or more areas visible to the one or more depth cameras but occluded to the two color camera sensors.

8. An apparatus for depth image enhancement, the apparatus comprising:
a color camera sensor;
one or more depth camera sensors; and
a processor configured to:
read and process Phase Detection Autofocus (PDAF) pixels of a region-of-interest (ROI) area of a gaze region in an image obtained from the color camera sensor;
process one or more depth maps of the ROI area of the gaze region obtained from the one or more depth camera sensors; and
combine the processed PDAF pixels of the ROI area of the gaze region and the one or more depth maps of the ROI area of the gaze region to obtain an updated ROI area comprising complementary depth information of the ROI area of the gaze region;
processing and combining the PDAF pixels and the one or more depth maps without reprojecting the depth data onto the image captured by the color camera sensor, and
wherein the processing and combination preserve the frame rate and output bandwidth of the apparatus.

9. The apparatus of claim 8, wherein the color camera sensor and the one or more depth camera sensors are at different physical locations in the apparatus.

10. The apparatus of claim 8, wherein the color camera sensor is one of a: dual pixel PDAF camera or all pixel PDAF camera.

11. The apparatus of claim 8, wherein the one or more depth camera sensors is one of a: Time-of-Flight (ToF) camera or a Light Detection and Ranging (LiDAR) camera.

12. The apparatus of claim 8, further comprises two color camera sensors in a stereo configuration, wherein the reading and processing of the PDAF pixels comprises reading PDAF pixels of a plurality of ROI areas of a gaze region of a scene captured by the two color camera sensors in the stereo configuration.

13. The apparatus of claim 12, wherein the reading and processing of the PDAF pixels further comprises dividing the plurality of ROI areas of the gaze region in such a way that the divided plurality of ROI areas are complementary to each other and partially overlapping with each other.

14. The apparatus of claim 13, wherein the combining of the processed PDAF pixels comprises combining PDAF pixels of the divided plurality of ROI areas to obtain complementary depth information of the plurality of ROI areas of the gaze region.

15. The apparatus of claim 12, wherein the reading and processing of the PDAF pixels further comprises excluding reading of depth camera pixels for one or more areas visible to the one or more depth cameras but occluded to the two color camera sensors.

* * * * *